Nov. 20, 1934. W. D. ARCHEA 1,981,216
MILLING MACHINE
Filed June 13, 1930 2 Sheets-Sheet 1

Inventor
WALTER D. ARCHEA
By A. K. Parsons
Attorney

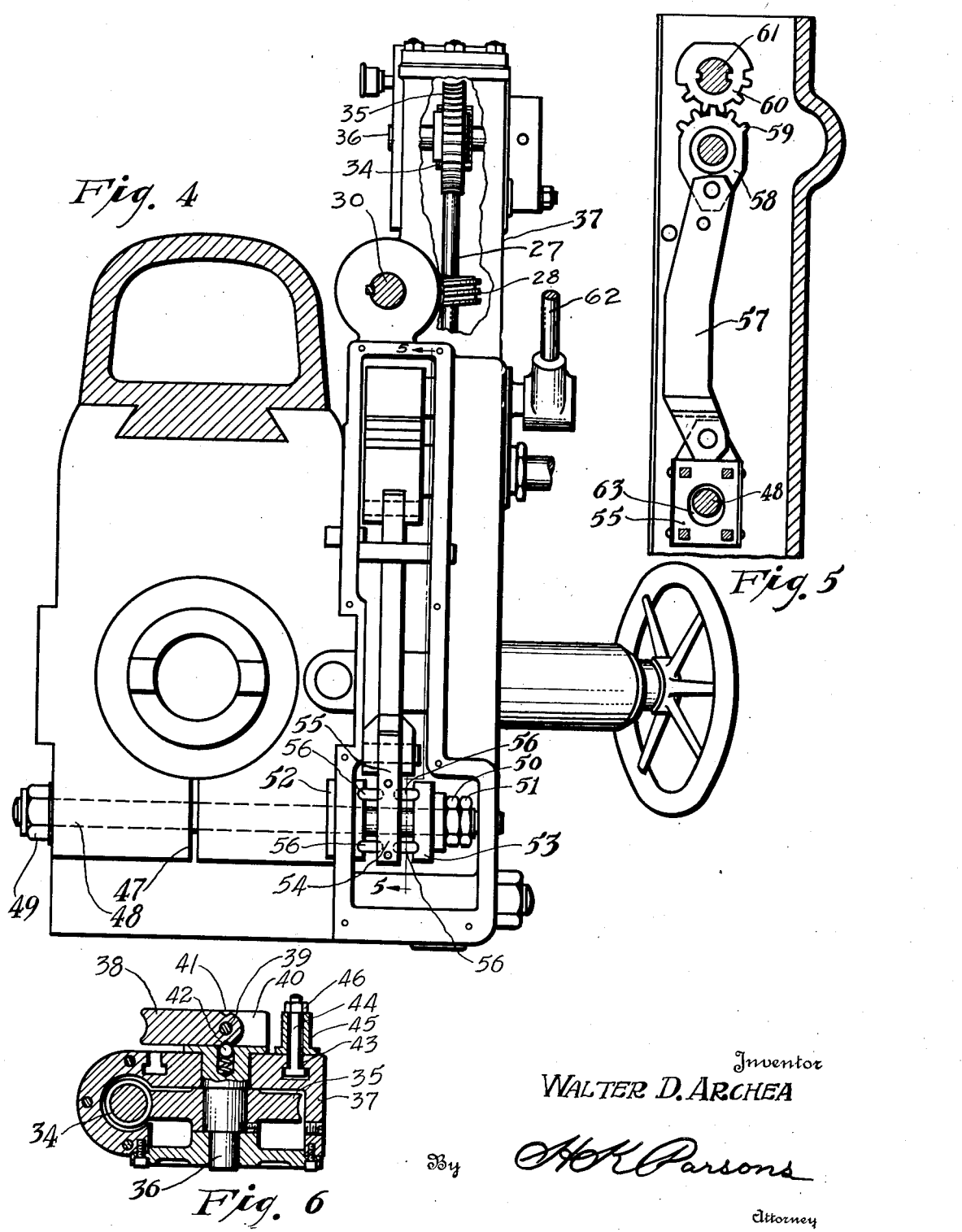

Patented Nov. 20, 1934

1,981,216

UNITED STATES PATENT OFFICE 1,981,216

MILLING MACHINE

Walter D. Archea, Cincinnati, Ohio, assignor to The Cincinnati Milling Machine Company, Cincinnati, Ohio, a corporation of Ohio Application June 13, 1930, Serial No. 460,999

11 Claims. (Cl. 90—16)

This invention relates to milling machines and more particularly to an improved control mechanism therefor.

One of the principal objects of the present invention is the provision of a remote control means for adjusting the cutter spindle of a milling machine with respect to the work table and for clamping it in adjusted position.

A further object of this invention is the provision in a milling machine having a work support and an adjustable spindle carrier on one side of the support, of means for adjusting the spindle axially of its carrier from an operating position on either side of the support.

A still further object of this invention is the provision of stop means for a spindle adjusting mechanism whereby a cutter carried by the spindle may be successively moved to a predetermined position with respect to a work carrier.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like parts:

Figure 4 is a view as on the line 4—4 of Figure 1 with the cover plate removed showing the clamping mechanism.

Figure 5 is a section on the line 5—5 of Figure 4, and

Figure 6 is a detail section on the line 6—6 of Figure 1.

Figures 1, 2, 3:
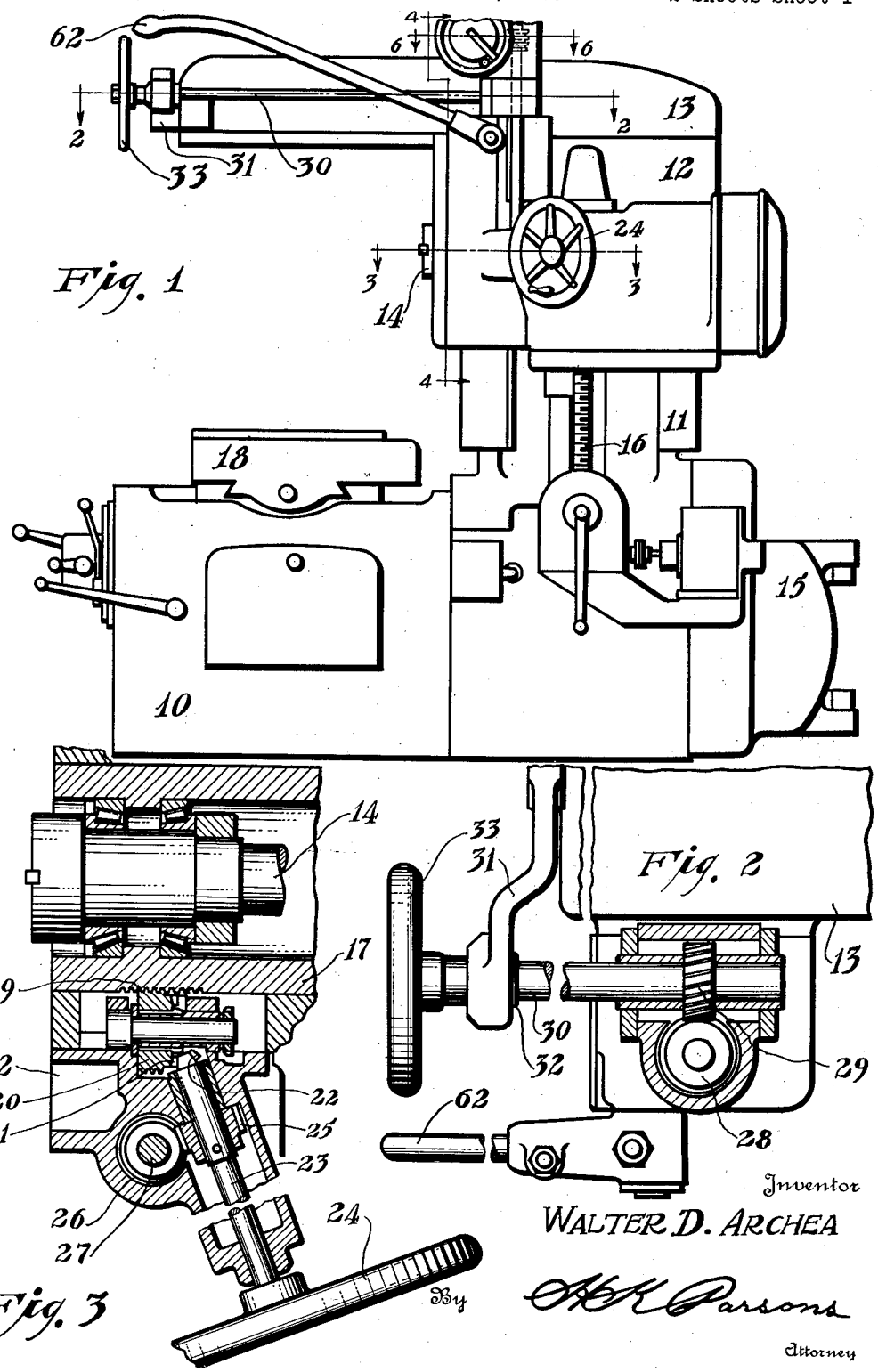
Figure 1 is an elevation of a milling machine embodying the principles of this invention.
Figure 2 is a partial section on the line 2—2 of Figure 1.
Figure 3 is a section on the line 3—3 of Figure 1.

In the drawings the reference numeral 10 indicates the base of a milling machine having uprising therefrom a vertical column 11 upon which is adjustably mounted the spindle carrier 12, the top of which supports the overarm 13 for longitudinal adjustment with respect to the carrier. The cutter spindle 14 is journaled in the carrier for actuation by a prime mover 15 which is attached to the base of the machine and adapted to drive the spindle in any suitable manner. An adjusting screw 16 is provided for moving the carrier with respect to the column.

The cutter spindle 14 is journaled in a quill 17, as shown in Figure 3, for independent rotation but fixed therewith for longitudinal movement. The quill is provided on its outer surface with a rack portion 19 which is engaged by a worm gear 20 journaled on a stud shaft fixed in the carrier. The worm is provided on an end face with beveled gear teeth 21 which mesh with the beveled gear 22 mounted on the end of a shaft 23 which is journaled in the carrier and has attached to its outer end the hand wheel 24. Rotation of the hand wheel will cause, through the intermediate gear, a longitudinal movement of the quill and the spindle carried thereby. This movement will be toward or from the work depending upon the direction of rotation of the hand wheel. It will be noted from Figure 1 that the hand wheel is so positioned that the operator may control the movement of the spindle from a position at the side of the column.

Additional means have been provided for controlling the adjustment of the spindle from the front of the machine or in other words, on the side of the work table opposite to the first control means just described. To this end the shaft 23 is provided with a spiral gear 25 which meshes with a similar spiral gear 26 fixed to the end of a vertical shaft 27. This shaft extends upward from the spindle carrier into the housing 37 and has another spiral gear 28 keyed therewith, as shown in Figure 2, which meshes with the gear 29 keyed to the horizontal shaft 30 which is also journaled in the housing 37. This shaft extends parallel to the overarm and is supported at its outer end in a bracket 31 secured to the end of the overarm. Since the overarm 13 is longitudinally adjustable with respect to the spindle carrier, the bearing 32 carried by the bracket 31 is adapted to slide with respect to the shaft 30. This arrangement provides a support for the outboard end of the shaft while still permitting adjustment of the overarm. A hand wheel 33 is secured to the end of the shaft 30 for effecting rotation thereof which, through the gear pairs 28, 29 and 25, 26, will rotate the worm 20 meshing with the rack 19 to adjust the quill. By referring to Figure 1, it will be seen that the operator may use the hand wheel 33 to adjust the spindle if he is on one side of the table 18 or the hand wheel 24 if he is on the other side of the table. In other words, the spindle 14 may be axially adjusted from either one of two positions.

It frequently occurs in the machining of particular shapes of work that the cutter must be longitudinally adjusted to and from a predetermined plane whereby a counter sunk surface, for instance, may be finished to the same depth in a plurality of work pieces and in such cases it is desirable to have a stop or position determining means whereby the spindle may be successively moved to such a position and the operator relieved of the necessity of determining the position by measurement for each piece. Therefore, means have been provided in the present instance for limiting the outward movement of the spindle toward the work and facilitate adjustment thereof with a minimum of attention on the part of the operator. To this end the shaft 27 has been extended upward and provided on its upper extremity with a worm gear 34 which meshes with worm wheel 35, as shown in Figures 4 and 6. The worm wheel is keyed or otherwise secured to a short shaft 36 journaled in the housing 37. The shaft 36 is bifurcated at one end for receiving the member 38 which is pivoted therein on the pin 39 fixed in the end of the furcations 40. The member 38, which serves as a pivoted dog, is provided with detents 41 formed on opposite sides thereof. A spring pressed ball 42 is mounted in the end of the shaft in position to engage either one of the detents depending upon the position of the dog. This arrangement permits the dog to be swung about the pin 39 to either one of two positions while the detent mechanism acts to maintain it in either position.

The housing 37 is provided with a circular T-slot 43 and a radial T-slot is also provided which intersects the circular T-slot to permit insertion of a T-headed bolt into the circular slot. A T-bolt, such as 44, provided with a bushing 45 is adjustably mounted in the slot to act as a stop for the dog 38. A nut 46 threaded on the end of the T-bolt serves as a means to lock the parts in adjusted position.

From the foregoing it will be seen that any adjustment of the quill will cause rotation of the shaft 27 which in turn will cause angular movement of the dog 38 about the axis of the shaft 36 until it abuts against the bushing 45. By adjusting this bushing in the manner heretofore described it will be seen that a stop has been provided which may be set in any desired position to limit the outward movement of the quill and thus the cutter spindle carried thereby to any desired amount.

Since the fit of the quill in its bore must be relatively loose to permit adjustment thereof, it is desirable that after an adjustment has been made that the quill be clamped in order to prevent vibration thereof which might cause chatter of the cutter. For this reason the spindle carrier is formed with a slot 47 which intersects the bore for the quill. A bolt 48 is passed through the two halves and provided with a nut 49 fixed on one end and an adjustable nut 50 and locking nut 51 on the other end. Collars or thrust plates 52 and 53 are mounted on the locking bolt 48 between the face of the spindle carrier and the adjustable nut 50. A toggle joint, indicated generally by the reference numeral 54, is inserted between the thrust plates so that upon expansion of the joint the thrust plates will separate causing the two halves of the spindle carrier to be forced together to clamp the quill. The toggle joint in this case may comprise the toggle plate 55 and the toggles 56 which are rounded at their ends to engage the arcuate recesses formed in the toggle plate and the thrust plates. To effect operation of the toggle joint a link 57 is pivoted at one end to the toggle plate and at the other end to the oscillatable member 58 which has a gear quadrant 59 formed thereon in mesh with a gear quadrant 60 keyed to the end of a horizontal operating shaft 61. The shaft 61 is journaled in the housing and provided at its other extremity with an operating handle 62, which it is apparent from Figure 1, may be operated from either side of the work table. Upon downward movement of the handle 62, the member 58 will be rotated to cause downward movement of the link 57 which in turn will cause downward movement of the toggle plate 55. This plate is provided with an elongated slot 63 which permits movement of the plate laterally of the shaft or bolt 48 without interfering therewith. The downward movement of the plate 55 will cause the toggles to move to a position parallel with the axis of the locking bolt 48 thus causing the thrust plates 52 and 53 to separate which in turn causes the two halves of the carrier to be drawn together and thereby clamp the quill.

From the description it will be apparent that a very efficient structure has been provided for adjusting and clamping a cutter spindle quill which may be operated from either one of two positions together with position determining means by which the cutter may be successively moved to the same position with respect to successive work pieces that may be placed upon the table.

I claim:

1. A milling machine having a column, a cutter spindle supported on the column for rotative movement and for axial movement, remote control means including a hand wheel for effecting axial adjustment of the spindle, toggle operated clamp means for securing the spindle in adjusted position, and a remote control lever for said toggle means situated adjacent said hand wheel.

2. A milling machine having a bed, a table reciprocably mounted thereon, a column adjacent the table for supporting a cutter spindle, said cutter spindle being mounted for axial movement toward and from a work piece carried by the table, means to effect said axial adjustment of the spindle and means to clamp the spindle in adjusted position, an overarm mounted on the column, means supported by the end of the overarm for operating said adjusting means, and means closely adjacent thereto for operating said clamping means.

3. A milling machine having a support, a work table reciprocably mounted on the support, a spindle carrier adjustably mounted on the support for relative movement with respect to the work table, said carrier having an over-arm projecting therefrom over the work table, a quill reciprocably mounted in the carrier, a cutter spindle journaled in the quill, a rotatable member journaled in the carrier for effecting axial adjustment of the quill and contained spindle, manual actuating means for the member, a longitudinal shaft journaled on the over-arm with one end adjacent the side of the table opposite the column, means to fix the shaft against longitudinal movement whereby the overarm may be adjusted without disturbing the relationship of the projecting end of the shaft with respect to the side of the table, a vertical shaft journaled in the carrier operatively coupling the longitudinal shaft to the rotatable member, and means on the free end of the longitudinal shaft for effecting rotation thereof and thereby axial adjustment of the spindle in its carrier.

4. A milling machine having a support, a work table reciprocably mounted on the support, a spindle carrier adjustably mounted on the support for relative movement with respect to the work table, said carrier having an overarm projecting therefrom over the work table, a quill reciprocably mounted in the carrier, a cutter spindle journaled in the quill, a rotatable member journaled in the carrier for effecting axial adjustment of the quill and contained spindle, manual actuating means for the member, a longitudinal shaft journaled on the overarm with one end adjacent the side of the table opposite the column, means to fix the shaft against longitudinal movement whereby the overarm may be adjusted without disturbing the relationship of the projecting end of the shaft with respect to the side of the table, a vertical shaft journaled in the carrier operatively coupling the longitudinal shaft to the rotatable member, means on the free end of the longitudinal shaft for effecting rotation thereof and thereby axial adjustment of the spindle in its carrier, said vertical shaft projecting above the carrier, a rotatable lever driven by the shaft and adjustable stops for limiting the arc of movement of the lever and thereby the range of travel of the spindle.

5. A milling machine having a support, a work table reciprocably mounted on the support, a spindle carrier adjustably mounted on the support for relative movement with respect to the work table, said carrier having an overarm projecting therefrom over the work table, a quill reciprocably mounted in the carrier, a cutter spindle journaled in the quill, a rotatable member journaled in the carrier for effecting axial adjustment of the quill and contained spindle, manual actuating means for the member, a longitudinal shaft journaled on the overarm with one end adjacent the side of the table opposite the column, means to fix the shaft against longitudinal movement whereby the overarm may be adjusted without disturbing the relationship of the projecting end of the shaft with respect to the side of the table, a vertical shaft journaled in the carrier operatively coupling the longitudinal shaft to the rotatable member, means on the free end of the longitudinal shaft for effecting rotation thereof and thereby axial adjustment of the spindle in its carrier, said vertical shaft projecting above the carrier, a rotatable lever driven by the shaft, and adjustable stops for limiting the arc of movement of the lever and thereby the range of travel of the spindle, said lever being pivotally mounted at its axis for angular movement through a plane at right angles to its normal plane of operation to thereby permit an adjustment of the spindle beyond its normal range of adjustment.

6. A milling machine having a support, a work table reciprocably mounted on the support, a spindle carrier adjustably mounted on the support for relative movement with respect to the work table, said carrier having an overarm projecting therefrom over the work table, a quill reciprocably mounted in the carrier, a cutter spindle journaled in the quill, a rotatable member journaled in the carrier for effecting axial adjustment of the quill and contained spindle, manual actuating means for the member, a longitudinal shaft journaled on the overarm with one end adjacent the side of the table opposite the column, means to fix the shaft against longitudinal movement whereby the overarm may be adjusted without disturbing the relationship of the projecting end of the shaft with respect to the side of the table, a vertical shaft journaled in the carrier operatively coupling the longitudinal shaft to the rotatable member, means on the free end of the longitudinal shaft for effecting rotation thereof and thereby axial adjustment of the spindle in its carrier, means to clamp the quill in the carrier after adjustment including a clamping bolt, a toggle mechanism operatively connected to the bolt, means to adjust the movement effected by said mechanism, a shaft pivotally mounted on the upper part of the carrier, motion transmitting mechanism coupling the shaft to the toggle mechanism, and an operating lever connected to the shaft, said lever projecting over the table and parallel to the overarm whereby the spindle may be longitudinally adjusted and clamped from a position at the table remote from the column.

7. A milling machine having a column, a reciprocating table carried thereby, an overarm carried by the column for adjustment in a longitudinal path, a spindle carrier mounted in the column and having a cutter spindle journaled therein, means for effecting axial adjustment of the cutter spindle relative to its carrier including a remote control shaft fixed at one end in said carrier against axial movement and extending parallel to the overarm, bearing means carried by the overarm for supporting the outboard end of said shaft in all positions of adjustment of the overarm, motion transmitting mechanism coupling the shaft for spindle adjustment whereby rotation of the shaft will effect axial adjustment of the spindle while its carrier remains stationary, and manually operable means for rotating said shaft.

8. A milling machine having a column, a spindle carrier adjustably mounted thereon, a sleeve mounted in the carrier for axial movement, a cutter spindle journaled in said sleeve but fixed therewith for joint longitudinal movement, adjusting means for said sleeve mounted in the carrier and operable from a plurality of operating positions, a sleeve adjusting control lever at each operating position, motion transmitting mechanism coupling each lever to the adjusting means, and a single adjustable stop for the sleeve mounted on the carrier for limiting the outward movement of the spindle regardless of the operating position at which said movement is controlled.

9. A milling machine having a column, a reciprocating table carried thereby, an overarm mounted on the column for adjustment in a longitudinal path, a cutter spindle carried by the column and adapted for axial movement in a path parallel to the first named path, a control shaft fixed at one end in said column against axial movement and projecting parallel to said overarm, means carried by the overarm for journaling the outboard end of said shaft in all positions of overarm adjustment, spindle adjusting mechanism carried by the column, motion transmitting means coupling said shaft to the mechanism, and manually operable means adjacent the end of the over-arm for actuating said shaft and thereby effecting axial adjustment of the spindle from a position remote relative to the spindle.

10. A milling machine having a support, a cutter spindle carried by the support, a quill for supporting said spindle for axial adjustment and including an operating shaft, means for limiting the adjustment in both directions including a fixed circular plate, stops selectively positionable about the periphery of said plate, an arm rotatably mounted in the center of said plate and operatively connected to said shaft for limiting upon contact with the stops the movement of said spindle.

11. A milling machine having a support, a cutter spindle carried by the support, a quill for supporting said spindle for axial adjustment and including an operating shaft, means for limiting the adjustment in both directions including a fixed circular plate, stops selectively positionable about the periphery of said plate, an arm rotatably mounted in the center of said plate and operatively connected to said shaft for limiting upon contact with the stops the movement of said spindle, said arm being also mounted for movement in a second direction whereby it may be positioned out of contact with said stops, and detent means for holding said arm in either position.

WALTER D. ARCHEA.